(12) United States Patent
Datta et al.

(10) Patent No.: US 6,393,572 B1
(45) Date of Patent: May 21, 2002

(54) SLEEPMODE ACTIVATION IN A SLAVE DEVICE

(75) Inventors: Dev Datta, Fremont; Rune H. Jensen; Calto Wong, both of Sunnyvale; Daisuke Takise, San Jose, all of CA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/300,902

(22) Filed: Apr. 28, 1999

(51) Int. Cl.[7] ................................................. G06F 1/32
(52) U.S. Cl. ........................................ 713/322; 713/601
(58) Field of Search .................................. 713/500, 600, 713/601, 300, 320, 322, 323

(56) References Cited

U.S. PATENT DOCUMENTS 6,263,075 B1 * 7/2001 Fadavi-Ardekani et al. 379/399

OTHER PUBLICATIONS www.sigmatel.com/datasheets/9708sspec.pdf , pp. 35–37.
download.intel.com/pc–supp/patform/ac97/ac97r21.pdf , AC'97 Component Specification Revision 2.1 May 22, 1998 Intel Corporation, p. 88.
www.cirrus.com/ftp/pubs/4280.pdf CS4280 Cirrus Logic Crystal Clear PCI Audio Interface, paes 9 (fig. 6) 12, 13.
www.national.com/ds/LM/LM4547.pdf LM4547 AC97 rev 2 Codec with National 3D Sound, pp. 9 and 16.

* cited by examiner

*Primary Examiner*—Thomas M. Heckler

(57) ABSTRACT

In a master-slave configuration wherein a sleepmode activation is effected by the cessation of a clocking signal, the need for an analog device or auxiliary clock for detecting the cessation of the clocking signal is obviated by anticipating the cessation of the clock signal. Upon anticipating the cessation of the clock signal, the remaining clock signaling before cessation is used as required to effect a controlled power-down of the slave device. By eliminating the need for an analog clock cessation detector, the process tolerance constraints associated with analog circuitry can be avoided, the reliability and robustness of the design is improved, and the required testing is simplified, thereby reducing the cost of the device. In like manner, the elimination of an auxiliary clock generator reduces the cost and complexity of the device and system, and improves the device and system's overall reliability and testability. In accordance with this invention, the anticipation of the cessation of the clock signal is achieved by monitoring the communications among devices for commands that can be expected to affect the generation of the clock signal.

14 Claims, 3 Drawing Sheets

SLEEPMODE ACTIVATION IN A SLAVE DEVICE

BACKGROUND OF THE INVENTION

1. Field of the Invention

This invention relates to the field of digital systems, and in particular to computer systems that employ primary and secondary, or master and slave, device configurations.

2. Description of Related Art

Parallel processing is often used to accomplish a variety of simultaneous tasks within a computing system. Special purpose devices, such as math coprocessors, audio and video coprocessors, and the like are often used to off-load tasks from the main processor to allow the main processor to perform other tasks while the special purpose devices are simultaneously performing the offloaded tasks.

A common offloaded task is the coding and decoding of audio information, using an Audio Codec (COder-DECoder), typified for example, by a device that conforms to the "Audio Codec '97 Rev 2.1" specification from Intel Corporation (Reference 1). The fundamental task of an audio codec is to accept digitally encoded information from a processor and provide a corresponding analog audio signal to a speaker or headset, and to accept analog audio information from a microphone and provide digitally encoded information to the processing system.

Because of the increasing demand for multimedia capabilities, the use of multiple codecs within a computer system is becoming increasingly common. The architecture of a multiple codec configuration in the referenced AC '97 specification is similar to that used for other configurations of multiple-instance devices. To ease interconnection logistics, the multiple codecs are configured to operate in parallel with each other, as illustrated in FIG. 1. FIG. 1 illustrates an AC'97 digital controller 110 and three codecs 121–123. To ease the synchronization and control demands on the computer system, one of the multiple codecs 121 is designated as the primary, or master, codec, and each of the other codecs 122, 123 are designated as secondary, or slave, codecs. The unique identification of each codec 121–123 is effected via the values associated with each codec's identifier bits ID0 and ID1; having two identification bits allows for up to four codecs to be uniquely identifiable. Other multiple-device systems may use more or fewer bits to accommodate more or fewer multiple instances. In a typical AC'97 configuration, the codecs are assigned unique identifiers via external pins that are tied to a logic 0 bus 140 or a logic 1 bus 141. As illustrated in FIG. 1, the identification bits ID0 and ID1 of the primary codec 121 are tied to the logic 0 bus 140, and therefore the identification, or address, of the primary codec 121 is "00". In like manner the addresses of codecs 122 and 123 are "01" and "10", respectively. As is common in the art, the polarity of the identification bits may be reversed; the specific values presented herein are for illustrative purposes only.

The digital controller 110 of FIG. 1 has a single data output port SDATA_OUT 132 that is communicated to each of codecs 121–123 in parallel. The digital controller uses the aforementioned unique address of each codec to route the appropriate information, or frame of data, to the appropriate codec. FIG. 2 illustrates an example prior art codec 120 (of which the codecs 121–123 are instances) that is configured to operate in a multiple-codec configuration. Illustrated in FIG. 2 is an input frame buffer 210 that receives each frame of data from the controller 110 (not shown in FIG. 2) via SDATA_OUT 132. Each frame of data includes an address field 212 and a command field 214 that identify the device for which the frame is intended, and the action required of the device. Not illustrated, each frame typically also contains data bits and ancillary bits, such as control bits, error field bits, status bits, and the like.

The codec 120 includes an address detector 220 that determines whether it is the intended recipient of the frame of data, by comparing the address field 212 of the frame to the logic values assigned to the identification bits ID0 200 and ID1 201 of the particular instance of the codec 120. If the address field 212 matches the identification bits 200, 201, the chip select signal 221 is asserted. When the chip select signal 221 is asserted, the command processor 230 processes the command 214 and communicates the appropriate commands and parameters for the signal processor 240 to effect the command 214. If the chip select signal 221 is not asserted, the command processor ignores the command 214 and the signal processor 240 is free to continue, uninterrupted, any remaining processing from prior commands that were addressed to this codec. In this manner, each codec 121–123 is provided time to perform their primary signal processing function while devoting minimal time to the processing of unrelated frame data that is received via the common SDATA_OUT 132.

Illustrated in FIG. 2 is a sleep, or power-down, circuit 290. Upon receipt of a sleep command 214 addressed to the particular device 120, the device 120 is placed into a mode that consumes minimal power. Using techniques common in the art, the sleep circuit 290 includes the control logic required to assure that the nodes in the device 120 are placed in a low power consuming state, and, if required, includes the control logic required to store any data that is required to be preserved until the device 120 is again awakened into an active, higher power, mode. Typically, the power-down of a device is a multi-step process; conventionally, the sleep circuit 290 includes sequential devices, and the clocking signal 131 provides the required clocking signaling for these devices, and other sequential devices within the device 120, as required.

In a typical master-slave configuration, the master device is often responsible for tasks that are common to all the devices. For example, a task of a typical AC'97 codec is to provide the clocking signal BIT_CLK 131 for communicating with the controller 110. In an AC '97 multiple-codec configuration, the primary codec 121 is tasked to provide the clocking signal 131 as an output, and each of the secondary codecs 122–123 must accept this clocking signal as an input. This common clocking signal is typically employed to assure the synchronization of a controller and each of the master and slave devices.

Because the master device provides the clocking signal, however, a power-down of the master device ceases the clocking signal to each of the slave devices, and this cessation can have an adverse effect on the subsequent operation of the slave devices, particularly if the slave devices contain dynamic memory that must be periodically refreshed to retain their state. The cessation of the clocking signal can also have an adverse effect on the effectiveness of the power-down, or sleepmode, operation by leaving nodes in potentially power consuming states.

To effect a controlled power-down after the cessation of the clock, the slave device must be aware that the clock has stopped, and must thereafter effect the appropriate actions to save any required memory contents and to assure that all nodes are in a minimal power consumption state. FIG. 2 illustrates the conventional use of a clock cessation detector 260 to effect a controlled power-down after the BIT_CLK 131 ceases its transitions. Analog circuitry, such as a "one-shot" timing circuit, may be employed in the clock cessation detector 260 to detect an absence of the clock signaling 131 after a predetermined time period. Alternatively, an auxiliary clock generator 250 is often provided for generating an auxiliary clocking signal 231 that is used to detect the absence of the clocking signal 131 using digital circuitry. Typically, the auxiliary clock generator 250 is a crystal driven circuit that requires that an external crystal, thereby increasing the system cost and complexity. Because the power-down of a device is usually a sequential process, the auxiliary clocking signal 231 is also used after the detection of the cessation of the common clock signal 131 to provide the clock signaling to effect the sequential power-down process.

BRIEF SUMMARY OF THE INVENTION

It is an object of this invention to reduce the cost of circuits that are configurable as slave devices by eliminating the analog circuitry commonly used to detect a cessation of a common clocking signal. It is a further object of this invention to reduce the cost of circuits that are configurable as slave devices by eliminating the need to generate an auxiliary clocking signal for detecting the cessation of a common clocking signal. It is a further object of this invention to reduce the cost of circuits that are configurable as slave devices by eliminating the need to generate an auxiliary clocking signal for use after the cessation of a common clocking signal. It is a further object of this invention to improve the reliability and robustness of these devices. It is a further object of this invention to provide an AC'97 compatible codec that is suitable for use in a multiple codec configuration that is easier to manufacture and test than conventional AC'97 compatible codecs.

These objects and others are achieved by providing a means for anticipating the cessation of the clock signal, and thereby eliminating the need to expressly detect the cessation of the clock signal. Upon anticipating the cessation of the clock signal, the remaining clock signaling before cessation is used as required to effect a controlled power-down of the slave device. By eliminating the need for an analog clock cessation detector, the process tolerance constraints associated with analog circuitry can be avoided, the reliability and robustness of the design is improved, and the required testing is simplified, thereby reducing the cost of the device. In like manner, the elimination of an auxiliary clock generator reduces the system cost and the complexity of the device, and improves the system's and device's overall reliability and testability. In accordance with this invention, the anticipation of the cessation of the clock signal is achieved by monitoring the communications among devices for commands that can be expected to affect the generation of the clock signal.

BRIEF DESCRIPTION OF THE DRAWINGS

The invention is explained in further detail, and by way of example, with reference to the accompanying drawings wherein.

DETAILED DESCRIPTION OF THE INVENTION

This invention is based on the observation that the controlled cessation of a clock signal can be anticipated by observing, or "snooping", the commands that affect the generation of the clock signal.

Figure 1:
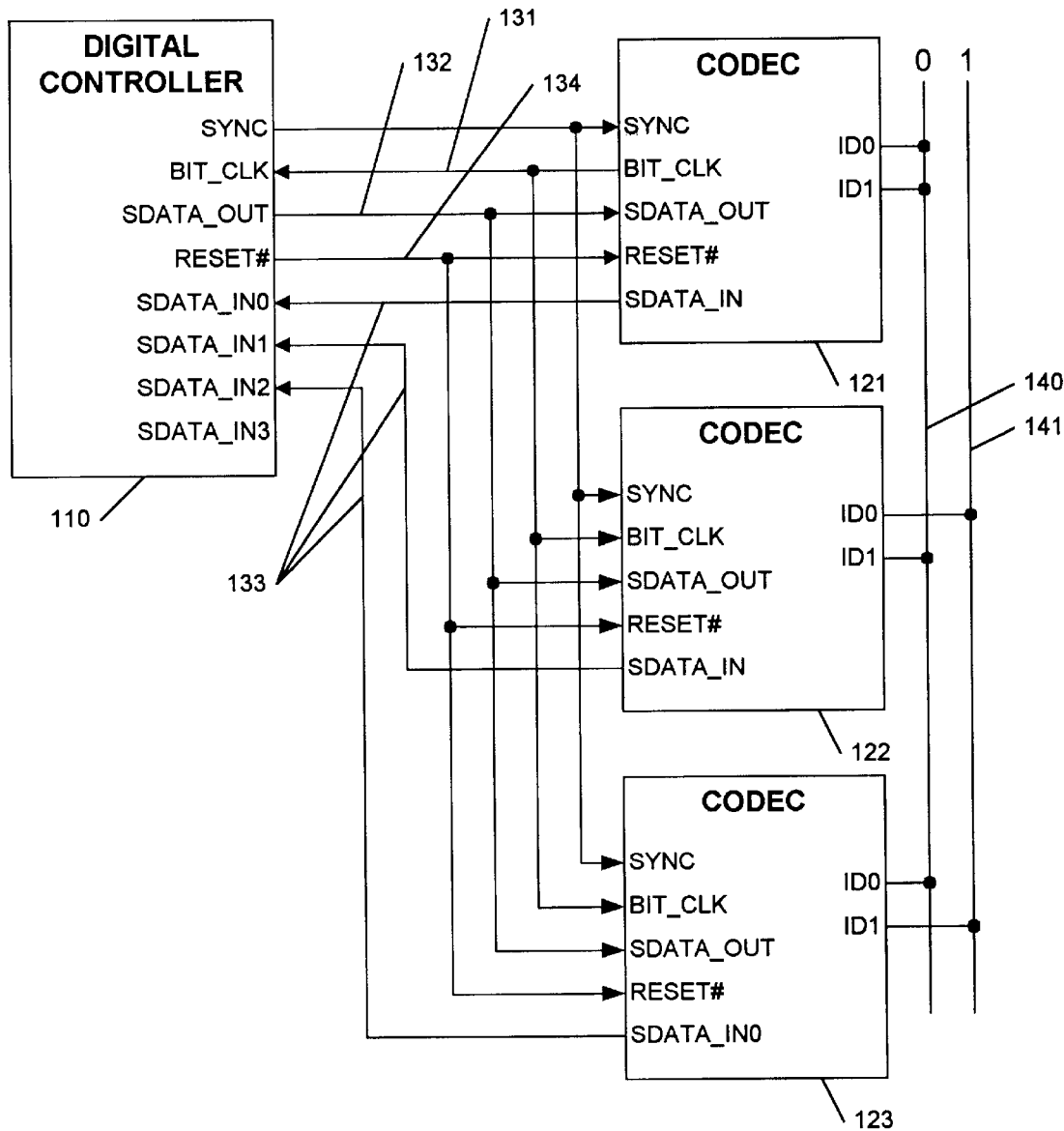
FIG. 1 illustrates an example prior art master-slave device configuration.
Figure 2:
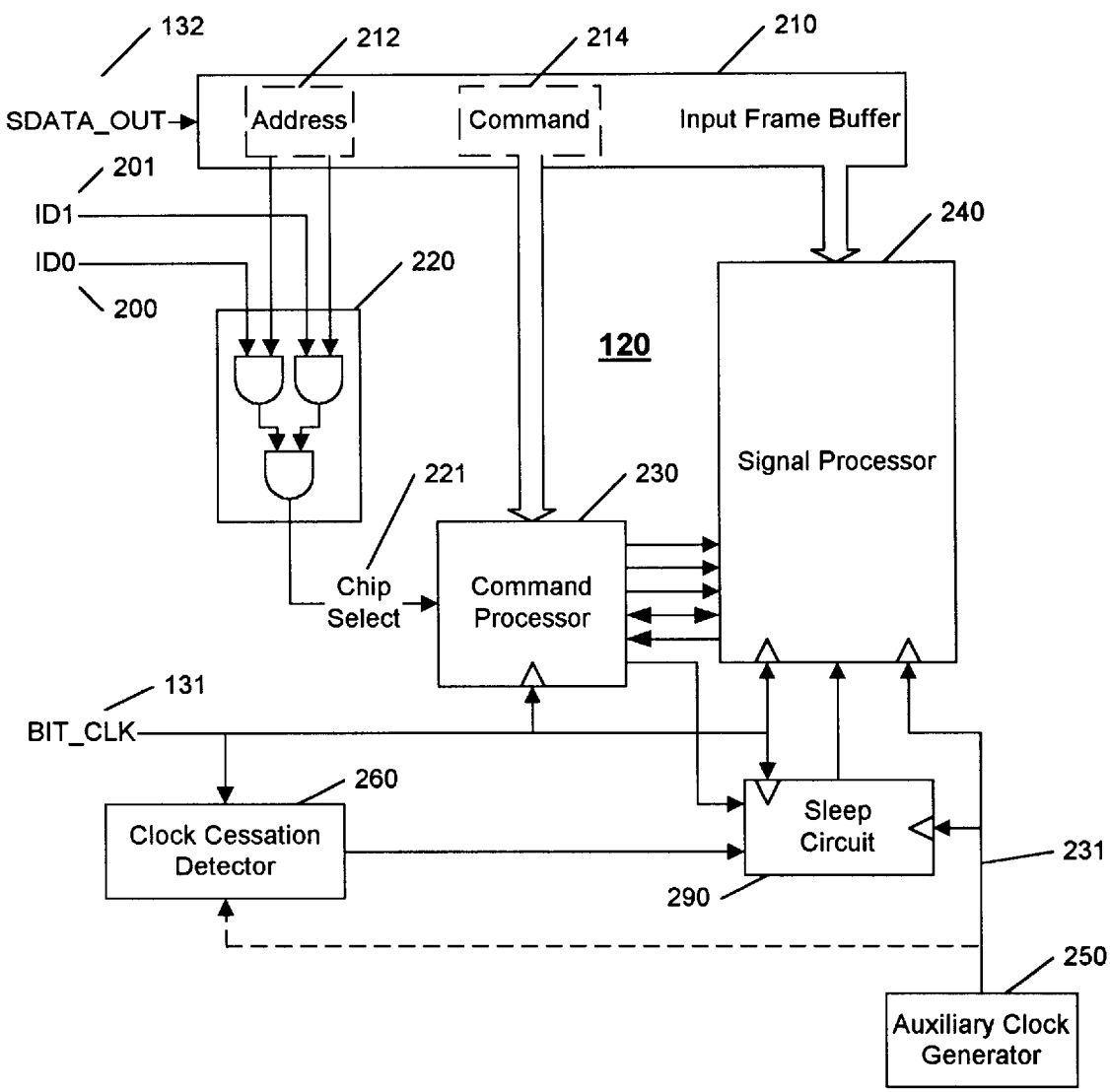
FIG. 2 illustrates an example prior art slave device having a clock cessation detector.
Figure 3:
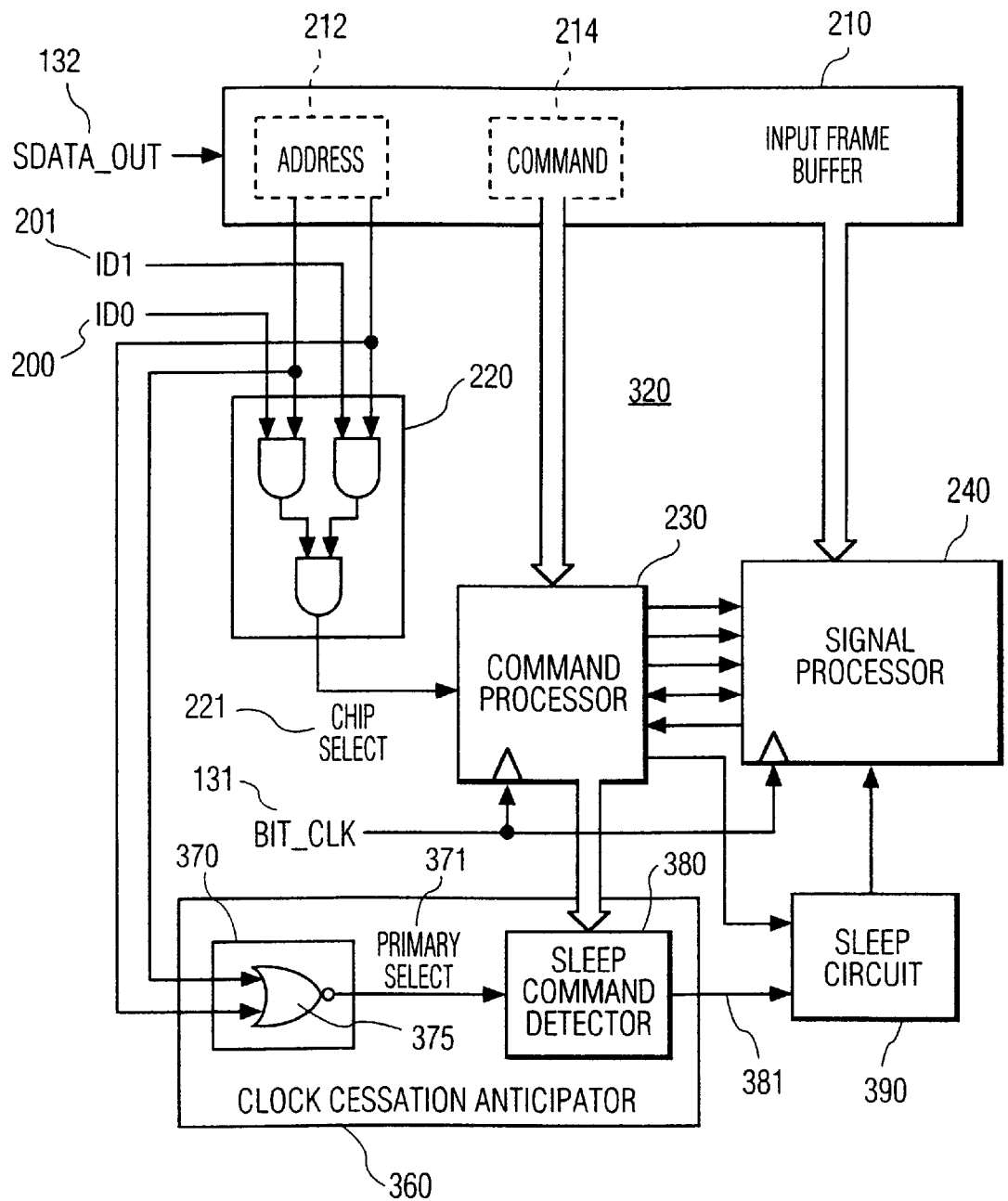
FIG. 3 illustrates an example slave device having a clock cessation anticipator in accordance with this invention.

FIG. 3 illustrates an example block diagram of an AC'97 compatible codec 320 that is suitable for use in the example multiple-codec configuration of FIG. 1. In FIG. 3, items having the same reference numerals as in FIGS. 1 and 2 perform the same fuction as described above with reference to these figures. The example of a multiple codec application is provided herein as a paradigm for typical master-slave configurations, for ease of understanding. Although this invention is presented using a multiple AC'97 codec example, the principles presented herein will be recognized by one of ordinary skill in the art to be applicable to similarly configured master-slave devices. Note also that the term "master" and "slave" are used herein in a general sense: the master device being a device that provides clock signaling, and the slave device being a device that receives the clock signaling from the master device.

In the example codec 320 of FIG. 3, a clock cessation anticipator 360 is used to detect any commands that can be expected to result in a cessation of the clock signal 131. In the example of an AC'97 compliant primary codec, for example, a command that sets the "PR4" bit of the "Powerdown Register" (bit 12 of register '26H) of the addressed codec requires the addressed codec to shut down the "Audio Codec link" (AC-link) between the controller 110 and the addressed device and turn off it's external clock. Similarly for an AC'97 compliant primary modem codec, setting the "MLNK" bit of the "Miscellaneous Modem AFE Status and Control Register" (bit 12 of register '56H) is also a command to shut down the AC-link. In the example of the AC'97 compliant codec, the BIT_CLK 131 clock signal will be held low by the primary codec when the primary codec receives either command from the controller 110 to shut down the AC-link. Other device configurations will have a similar finite set of commands and addressees that will cause the clock signaling to cease. The example clock cessation anticipator 360 is designed to detect these clock-cessation commands that are addressed to the primary codec. The clock cessation anticipator 360 receives the address 212 and command 214 from the input frame buffer 210. The clock cessation anticipator 360 includes an address detector 370 and a sleep-command detector 380. The address detector 370 is configured to detect the address of the device, or devices, that can receive a command to cease the clock. In this example, the AC'97 specification defines the address of the primary codec to be "00", and each of the secondaries the non-00 combinations. The NOR gate 375 asserts a primary select signal 371 only when the address 212 input is 00, corresponding to the AC'97 specification.

The sleep command detector 380 is enabled when the primary select signal 371 is asserted, indicating that the primary codec is being addressed, and asserts an anticipated clock cessation signal 381 when the command 214 is one of the aforementioned commands that result in a clock cessation. The sleep circuit 390 is similar to the sleep circuit 290 of FIG. 2, except that in addition to responding to sleep commands that are expressly addressed to the device 320, the sleep circuit 390 also responds to the anticipated clock cessation signal 381 to place the device 320 into a power-down sleep mode. That is, for example, in accordance with the principles of this invention, when the address 212 indicates the primary codec address of 00, and the command 214 indicates a setting of the aforementioned "PR4" bit or the "MLNK" bit to a logic value of 1, the sleep circuit 390 provides the required control signals to place the device 320 into a sleep mode. Because the device 320 detects the communication of the command that will place the master codec into a sleep mode at the same time that the master codec is able to detect the command, the device 320 will have the same amount of time as the master codes to effect a controlled powerdown operation. That is, for example, if the primary codec requires three clock cycles after receipt of a sleepmode command to retain its programmed settings and set its nodes to a low power consuming state, the secondary codec 320 will have these same three clock cycles to retain its programmed settings and set its nodes to a low power consuming state, the three clock cycles being provided by a continuation of the BIT_CLK 131 clock signaling until the master device enters the sleep mode. In this manner, when the primary codec ceases the generation of the BIT_CLK 131 clock signaling, the secondary codec 320 will be in its sleep mode, and an auxiliary clock signaling is not required to effect further sequential actions.

Another significant advantage of anticipating the cessation of the clock signaling 131 is that the codec is provided the time and clocking signals required to enable interrupt generation circuitry for use while the codec is powered down. For example, a ringing on a telephone line may generate an interrupt requiring the codec 320 to resume an active state from its sleep mode state. This interrupt is signaled to the AC'97 digital controller 110 by means of the codec driving SDATA_IN 133 high. Therefore, the circuitry in the codec 320 that allows the interrupt generation to occur must be enabled when the codec 320 is powered down. A further aspect of anticipating the cessation of the clock signaling 131 is that the codec 320 is typically required to discard the remainder of an incoming frame, for example, the frame in which the command to cease the clock was detected, and be prepared to receive an entirely new frame after the AC'97 digital controller 110 issues a warm reset 134 and the codec 320 resumes normal operation in an active, higher power, mode.

Note that because the cessation of the BIT_CLK 131 clock signaling is anticipated by the clock cessation anticipator 360, neither an analog timing circuit nor an auxiliary clock is required to detect the actual clock cessation. By eliminating the need for an analog clock cessation detector, the process tolerance constraints associated with analog circuitry can be avoided, the reliability and robustness of the design is improved, and the required testing is simplified, thereby reducing the cost of the device. In like manner, the elimination of an auxiliary clock generator reduces the complexity of the device, and improves the overall device and system cost, reliability, and testability.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the clock cessation command has been presented as one that is known to result in a cessation of the clock signal. In some systems, certain commands may produce a conditional cessation of the clock signal. That is, the cessation of the clock may depend on other factors or parameters that are not included in the command 214 that is monitored by the sleep command detector 380. In such systems, the device 320 can be configured to enter the sleep mode upon detection of the conditional cessation command, and then exit the sleep mode when the clocking signal occurs after its anticipated cessation time. In like manner, the clock cessation command has been illustrated as occurring on the same signal line SDATA_OUT 131 as commands that are directed to the device 320. As would be evident to one of ordinary skill in the art, the input to the clock cessation anticipator 360 can be appropriately modified to provide any other signal lines that may contain commands or signals that affect the generation of the clock signaling for the device 320.

The device 320 may be implemented in hardware, software, or a combination of both. For example, the signal processor 240 may be implemented as an electronic circuit, while the command processor 230 and sleep command detector 380 may be embodied in a firmware program operating within an embedded processor, or in a program operating on a separate processing system. The example device architecture and partitioning of functions are presented in the figures for illustrative purposes only. For example, the sleep command detector 380 may be embodied within the command processor 230, because the command processor 230 will typically contain a sleep command detector that is used to detect sleep commands expressly addressed to the secondary device 320. Similarly, the function of the sleep circuit 390 may be distributed throughout the device 320. In like manner, the tasks associated with each functional block will typically be dependent upon the technology employed. For example, a CMOS device consumes minimal power in either logic state, and therefore the sleep circuit 390 need not control the nodes within a CMOS implementation of the device 320 to achieve a low power state, and may only provide a control signal to set the output pins of the device 320 to whatever state the specification calls for in a low power mode. These various arrangements, and others, will be evident to one of ordinary skill in the art, and are within the intended scope of the following claims.

REFERENCES

1. Audio Codec '97, Revision 2.1, May 22, 1998, Intel Corporation. Copyright 1998 Intel Corporation, 5200 N.E. Elam Young Parkway, Hillsboro, Oreg. 97124-6497.

We claim:

1. A processing device that is suitable for use as a slave device that is configured to operate using a clock signal that is generated by a master device, the processing device comprising:

a signal processor that is configured to operate in dependence upon the clock signal, the signal processor having an active mode and a sleep mode, a clock cessation anticipator that is configured to monitor an input to the master device to provide an anticipation signal before a cessation of the clock signal, and a sleep circuit, operably coupled to the clock cessation anticipator and the signal processor, that is configured to place the signal processor into the sleep mode in dependence upon the anticipation signal.

2. The processing device of claim 1, wherein the input to the master device is identified by a primary device address, and the clock cessation anticipator includes:

a primary address detector that is configured to assert a primary select signal when the primary device address is detected on the input to the master device, and a sleep command detector that is configured to provide the anticipation signal in dependence upon the primary select signal and a clock cessation command on the input to the master device.

3. The processing device of claim 2, wherein an input to the processing device is identified by a secondary device address which differs from the primary device address, and the processing device further includes:
- a secondary address detector that is configured to assert a chip select signal when the secondary device address is detected on the input to the processing device, and
- a command processor that is configured to place the signal processor in the sleep mode in dependence upon the chip select signal and a clock cessation command on the input to the processing device.

4. The processing device of claim 3, wherein the input to the processing device includes the input to the master device.

5. A codec comprising:
- an input frame buffer for storing an input frame that includes an address field and a command field,
- a signal processor having an active mode and a sleep mode,
- a first address detector that asserts a primary select signal when the address field contains a first address,
- a second address detector that asserts a chip select signal when the address field contains a second address, and
- a sleep controller that places the signal processor into the sleep mode when the command field contains a sleep command and at least one of the primary select signal and the chip select signal is asserted.

6. The codec of claim 5, further including
- a sleep command detector that notifies the sleep controller when the command field contains the sleep command.

7. The codec of claim 5, wherein:
- the signal processor operates in dependence upon a clock signal that is provided by a primary device having a device address that corresponds to the first address.

8. The codes of claim 5, wherein the codec is an AC'97 compliant codec.

9. A system comprising:
- a plurality of codecs, each codec having an associated codec address, the plurality of codecs comprising a primary codec and at least one secondary codec, and
- a digital controller that communicates frames to the plurality of codecs, each frame including an address field and a command field, wherein the at least one secondary codec comprises:
- an input frame buffer for storing each frame communicated from the digital controller,
- a signal processor having an active mode and a sleep mode,
- a first address detector that asserts a primary select signal when the address field contains a first address,
- a second address detector that asserts a chip select signal when the address field contains a second address, and
- a sleep controller that places the signal processor into the sleep mode when the command field contains a sleep command and at least one of the primary select signal and the chip select signal is asserted.

10. The system of claim 9, wherein the at least one secondary codec further includes
- a sleep command detector that notifies the sleep controller when the command field contains the sleep command.

11. The system of claim 9, wherein:
- the signal processor operates in dependence upon a clock signal that is provided by a primary device having a device address that corresponds to the first address.

12. The system of claim 11, wherein the primary device is the primary codec.

13. The system of claim 9, wherein the system is an AC'97 compliant system.

14. The system of claim 9, further comprising:
- a computing device that offloads processing of audio information by communicating the audio information to the digital controller for processing by the plurality of codecs.

* * * * *